United States Patent [19]

Layden et al.

[11] 4,414,011

[45] Nov. 8, 1983

[54] METHOD OF SECURING FIBER REINFORCED GLASS MATRIX COMPOSITE MATERIAL TO STRUCTURAL MEMBERS

[75] Inventors: George K. Layden, Wethersfield; Karl M. Prewo, Vernon, both of Conn.

[73] Assignee: United Technologies Corporation, Hartford, Conn.

[21] Appl. No.: 381,802

[22] Filed: May 25, 1982

[51] Int. Cl.³ .............................................. C03C 25/00
[52] U.S. Cl. ....................................... 65/18.1; 65/3.2; 65/18.4; 65/33; 264/109; 264/112; 264/118; 501/89; 501/95
[58] Field of Search ...................... 501/89, 95; 65/3.2, 65/4.21, 18.1, 18.4, 33, 48; 264/109, 111, 112, 118, 125; 428/902

[56] References Cited

U.S. PATENT DOCUMENTS

| | | | |
|---|---|---|---|
| 3,681,187 | 8/1972 | Bowen et al. | 65/22 X |
| 4,047,993 | 9/1977 | Bartelmuss | 501/89 X |
| 4,103,063 | 7/1978 | Hulse | 501/95 X |
| 4,314,852 | 2/1982 | Brennan et al. | 501/89 X |
| 4,324,843 | 4/1982 | Brennan et al. | 428/902 X |
| 4,357,286 | 11/1982 | Stalcup et al. | 65/18.1 |
| 4,370,390 | 1/1983 | Burk | 501/95 |

Primary Examiner—Robert L. Lindsay, Jr.
Attorney, Agent, or Firm—Harry J. Gwinnell

[57] ABSTRACT

A method of securing fiber reinforced glass matrix composite material to structural members is disclosed. Two materials to be secured together are provided with a hole or other opening for insert of the fastening means. A fastening means, preferably a rivet or bolt is provided by hot pressing glass matrix material in and around unidirectionally oriented continuous length silicon carbide fibers. Such material is coined and optionally provided with threading. After formation, the bolt or rivet is inserted into the opening provided to attach the materials together and the open end of the rivet or bolt closed either by nut means or by heat deforming. The resultant secured composite-structural member remains inseparable in use, for example, in an environment of extreme temperature fluctuation. The structural member can also be fiber reinforced glass composite material, metal, unreinforced ceramic or other high temperature composite. The rivet or bolt is formed by hot-press forming a fiber reinforced composite material, slicing longitudinal rectangular sections from the composite and coining the longitudinal sections. Heads are also coined on the longitudinal sections thus formed. For the bolt embodiment, threads are also machined on the coined part.

10 Claims, 10 Drawing Figures 4,414,011

METHOD OF SECURING FIBER REINFORCED GLASS MATRIX COMPOSITE MATERIAL TO STRUCTURAL MEMBERS

The Government has rights in this invention pursuant to Contract No. N00014-81-C-0218 awarded by the Department of the Navy.

DESCRIPTION

1. Technical Field

The field of art to which this invention pertains is methods of securing structural members together, and particularly methods of securing such members by mechanical means.

2. Background Art

Because of the scarcity and increasing expense of many conventional high temperature structural metals, increased attention has focused on non-metal fiber reinforced composites as replacements for conventional high temperature metal alloys. Use of metal replacement, high strength fiber reinforced resin and even high strength fiber reinforced metal matrix composites has progressed to the point of commercial acceptance in products ranging from sporting goods to advanced jet aircraft components. One the big problems with these composites, however, has been their maximum use temperature.

Ceramic, glass and glass-ceramic bodies are known to the art which can be employed in high temperature applications. Unfortunately, however, these bodies frequently lack the mechanical strength desired and are invariably deficient in toughness and impact resistance. This situation has given rise to the preparation of composite bodies consisting of a matrix of ceramic, glass, or glass-ceramic material with inorganic fibers dispersed in continuous or discontinuous fashion therein. Henceforth referred to as glass matrix composites, these materials are described in U.S. Pat. Nos. 4,314,852 and 4,324,843.

As stated above, possible applications of these materials are anticipated in the gas turbine and other heat engine areas where the superior fracture toughness, oxidation resistance, and low density of these materials will result in marked improvement in an overall engine efficiency and fuel consumption. Similarly, it is anticipated that these fiber reinforced composites will be preferred in many high temperature non-engine structures because of their excellent toughness and oxidation resistance when compared to unreinforced ceramics and carbon-carbon composites. However, problems have been encountered and are anticipated in making attachments of these composite materials to themselves or to other structural components such as metal or ceramic components in these environments. These attachments must remain tight throughout large temperature excursions and must not incur corrosion of the attachment components because of material interaction or interaction of components with the engine environment. In most instances, it is anticipated that the fiber reinforced composite and its attachment will be exposed to the temperature extremes. Accordingly, such attaching means will suffer severe environmental conditions.

Accordingly, what is needed in this art is a method of securing fiber reinforced glass matrix composite materials to other structural members in secure fashion over prolonged periods of time and extreme environmental conditions.

DISCLOSURE OF INVENTION

The method of securing fiber reinforced glass matrix composite material to a structural member is disclosed. A rivet or bolt of continuous or discontinous length silicon carbide fibers in a high temperature stable glass matrix is produced by molding or hot pressing which is then used to secure the composite material to the structural member. The use of such fastening means results in a composite-structural member combination which remains securely fastened together under adverse conditions such as extreme temperature fluctuations. The structural member may be a fiber reinforced glass matrix composite itself or other structural material such as another composite, unreinforced ceramic, or metal.

Another aspect of the invention includes a method of making such rivets or bolts comprising forming a sheet of continuous length, unidirectionally oriented fiber reinforced glass composite material, cutting rectangular sections from such sheet, coining such rectangular sections to cylindrical forms, and coining bolt heads on such so treated forms. In the case of a bolt, threads are also machined or coined onto the cylindricl form.

The foregoing and other features and advantages of the present invention will become more apparent from the following description and accompanying drawings.

BEST MODE FOR CARRYING OUT THE INVENTION

Figure 1A:
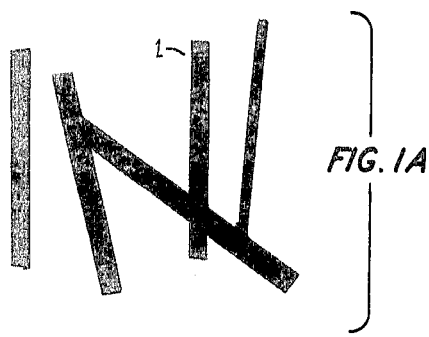
FIG. 1 shows typical preforms, molds and coined rods useful in performing the present ivnention.

Both the materials and methods of preparing the attaching means according to the present invention are as disclosed in commonly assigned U.S. Pat. Nos. 4,314,852 and 4,324,843, the disclosures of which are incorporated by reference. As disclosed therein, while any borosilicate glass which will impart high temperature strength properties to composites according to the present invention can be used with the present invention, Corning 7740 (Corning Glass Works) was found suitable for this process. Similarly, Corning 7930 (about 96% by weight silica) obtained by leaching the boron from a borosilicate glass, and Corning 1723 are preferred high silica content glass and aluminosilicate glass, respectively. While the borosilicate glass and the aluminosilicate glass can be used in its as received −325 mesh size form, the desired properties for the high silica content glass composites can only be satisfactorily fabricated with the glass after it has been ball milled in propanol for more than 100 hours. It should also be noted that mixtures of the above glasses can also be used. While any glass or glass-ceramic which will impart the requisite strength and environmental stability to the composites according to the present invention can be used, lithium aluminosilicate glass-ceramic has been found to be particularly well suited for this purpose.

During composite densification this matrix is retained in the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition, and heat treatment schedule employed. A wide variety of glass-ceramics can be used in this manner, however, when using silicon carbide fibers, a strict limitation on the amount and activity of titanium present in the glass is of controlling importance. Accordingly, if silicon carbide fibers and titania nucleating agents are used, the titania must be inactivated or kept below 1% by weight. This can be accomplished by simply substituting another nucleating agent such as zirconia for the conventional titania or adding an agent to mask the reactivity of the titania toward the silicon carbide fiber. However, in any case it is necessary to either eliminate or mask the effects of the titania on the silicon carbide fiber to attain a composite with good high temperature strength properties. And while conventional lithium aluminosilicate is the preferred glass-ceramic, other conventional glass-ceramics such as aluminosilicate, magnesium aluminosilicate, and combinations of the above can be used as long as the ceramic matrix material is titanium free (less than about 1% by weight) or masked. Note commonly assigned U.S. Pat. No. 4,324,843, the disclosure of which is incorporated by reference. In general, the starting glass-ceramic material can be obtained in the glassy state in powder form. If, however, the ceramic material is obtained in crystalline form, it will be necessary to melt the material to form it into the glassy state, solidify it and subsequently crush it into powder form, preferably about −325 mesh, prior to making up the slurries according to the present invention. It is important in selecting a glass ceramic material that one be selected which can be densified in the glassy state with the viscosity low enough to permit complete densification with subsequent transformation into a substantially completely crystalline state. It is also possible, however, to convert the starting crystalline powder to the glassy state during preheat treatment prior to application of pressure for densification.

While any high temperature stable fiber material can be used in the method according to the present invention, silicon carbide fibers are especially preferred. A multifilament silicon carbide yarn with an average filament diameter up to 50 microns, for example 5 to 50 microns, is especially preferred. Nippon Carbon Company of Japan produces such a yarn with about 250 fibers per tow and an average fiber diameter of about 10 microns. The average strength of the fiber is approximately 2000 MPa and it has a use temperature of up to 1200° C. The yarn has a density of approximately 2.6 grams per cubic centimeter and an elastic modulus of approximately 221 GPa.

If the attaching is performed with the rivet embodiment of the present invention, the end of the rivet is sealed as an ordinary rivet would be by increasing its temperature above the softening point of the glass matrix to prevent it from slipping out. If the bolt embodiment is used, a conventional metal nut or a fiber reinforced glass or glass-ceramic matrix composite nut made by cutting such pieces from a rectangular sheet of the composite material as described above for the rivet, or by the process of injection molding as described in commonly assigned, copending application Ser. No. 381,805, filed by the same applicants as the present invention of even date herewith and entitled "Molding Process for Fiber Reinforced Glass Matrix Composite Articles", can also be used. The disclosure of this application is incorporated by reference. The pieces to be secured together are drilled with holes to accommodate the rivets and bolts according to the present invention. Drilling of glass-ceramic matrix composite material is best accomplished using a diamond core drill. Alternatively, appropriately placed holes may be formed when the subject pieces are formed, e.g. by molding. Types of articles which can be secured according to the present invention are jet engine components such as outer tip shrouds, burner can segments, augmentor duct liners, spray bars, and vanes, these components being made of glass matrix composite material, or other high temperature stable composite material, or unreinforced high temperature stable ceramics.

EXAMPLE 1

Figure 1B:
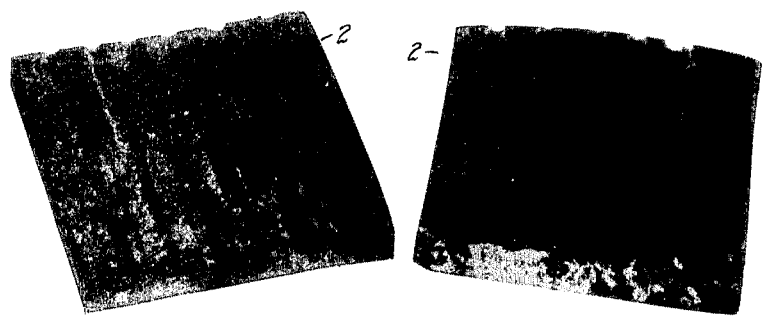
Figure 1C:
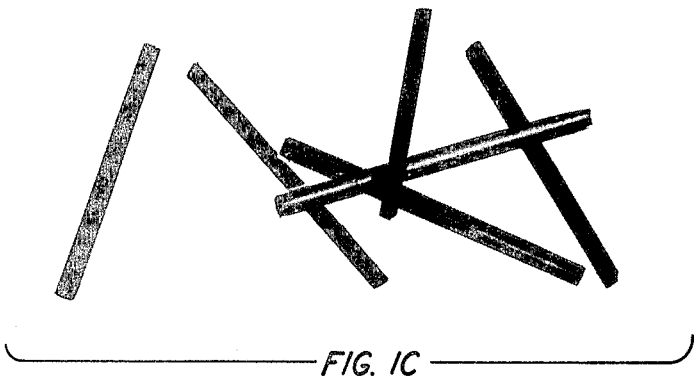
Figure 2:
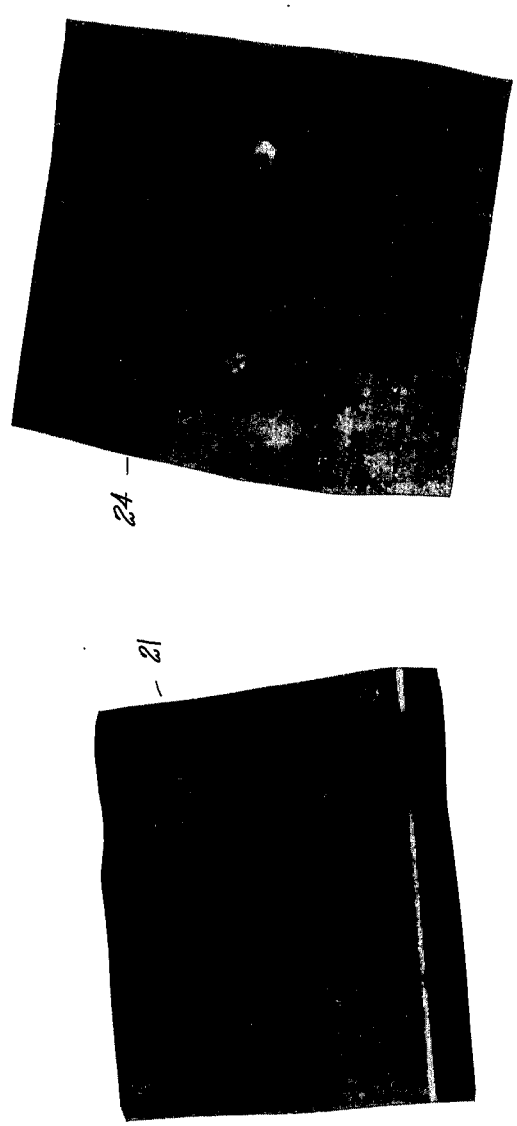
FIG. 2 shows a typical mold for coining the heads on rivets according to the present invention.
Figure 3:
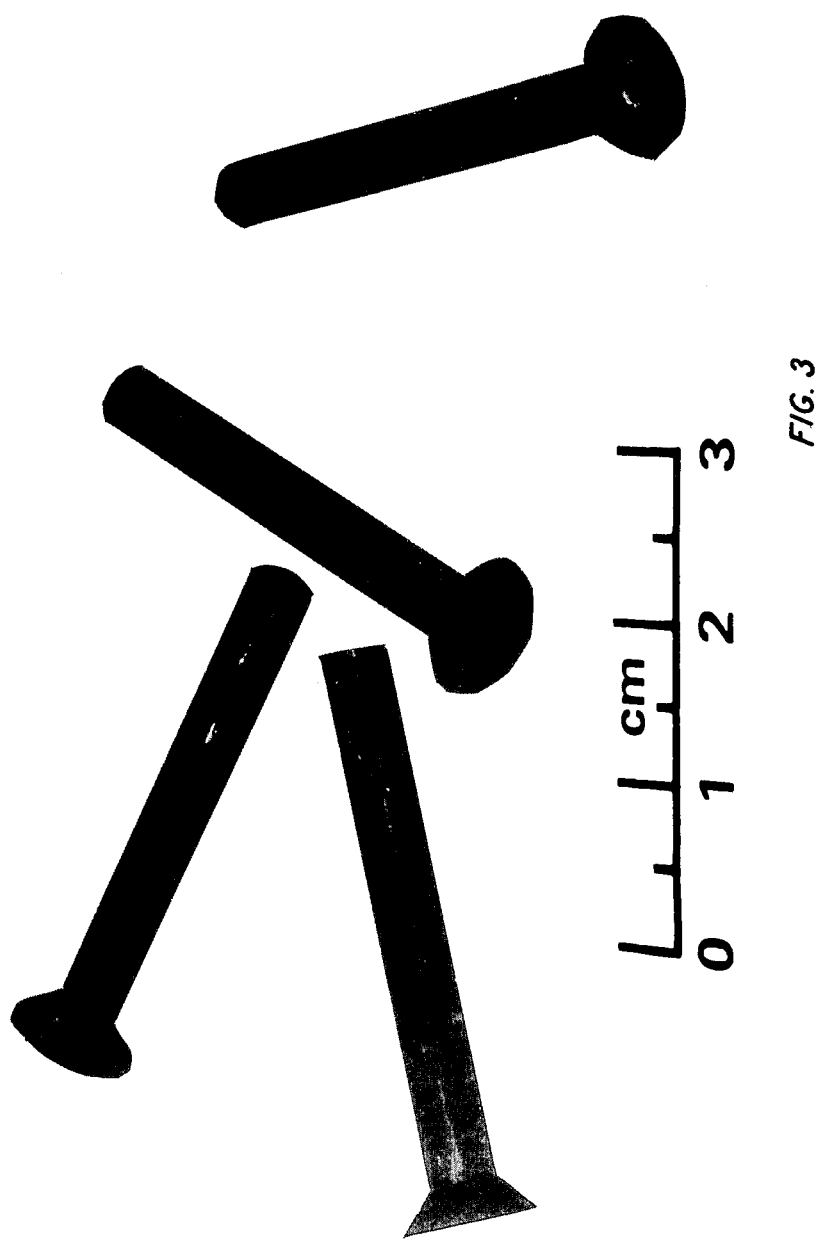
FIG. 3 shows rivets produced according to the present invention.
Figure 4:
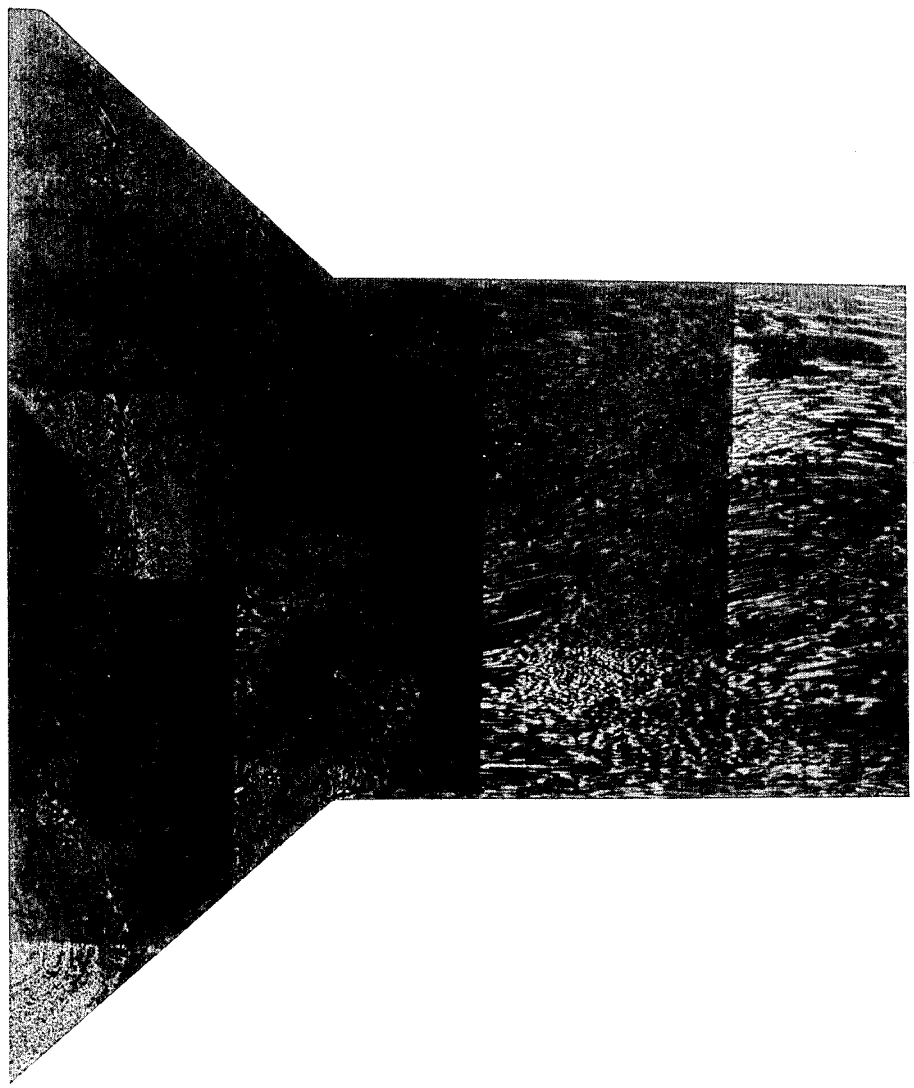
FIG. 4 is a photomicrograph of a section of such rivet.
Figure 5:
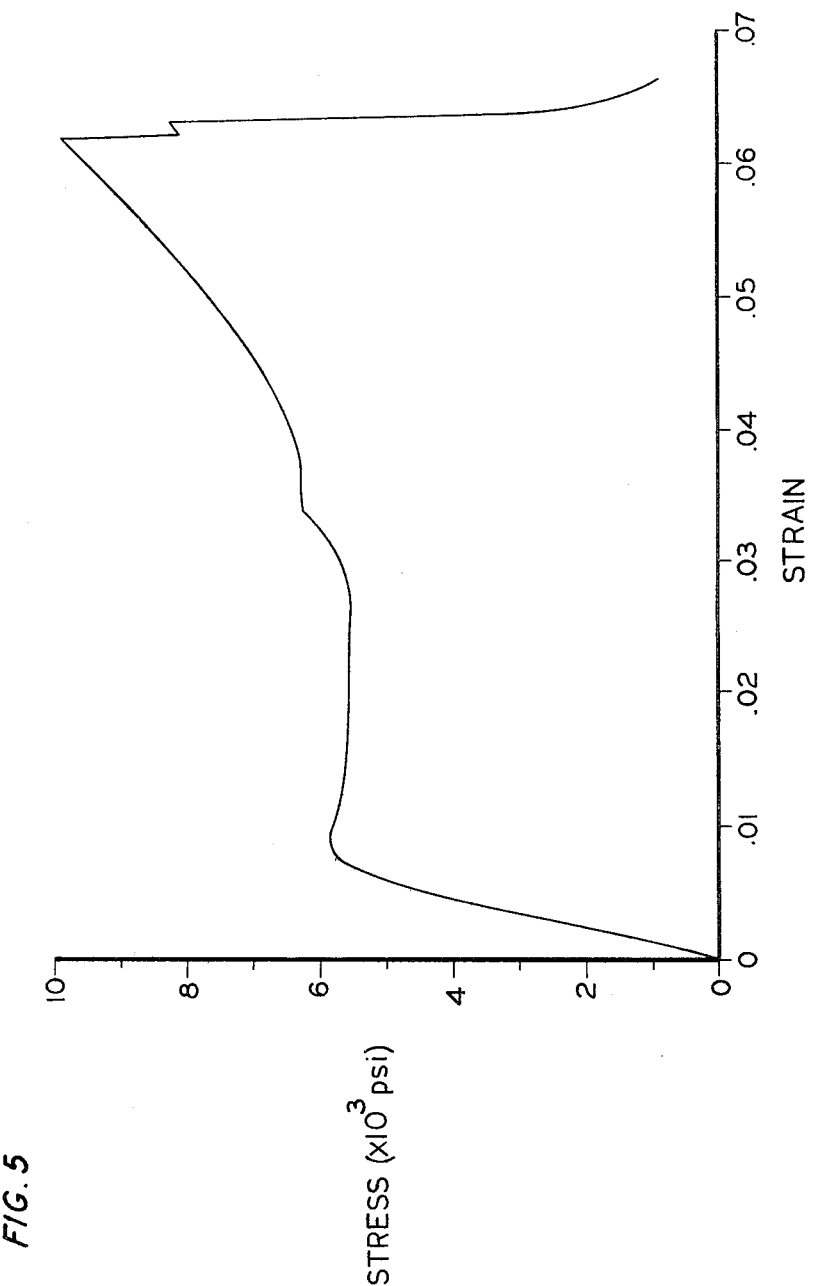
FIG. 5 is a stress strain curve for the formed rivets during testing.
Figure 6:
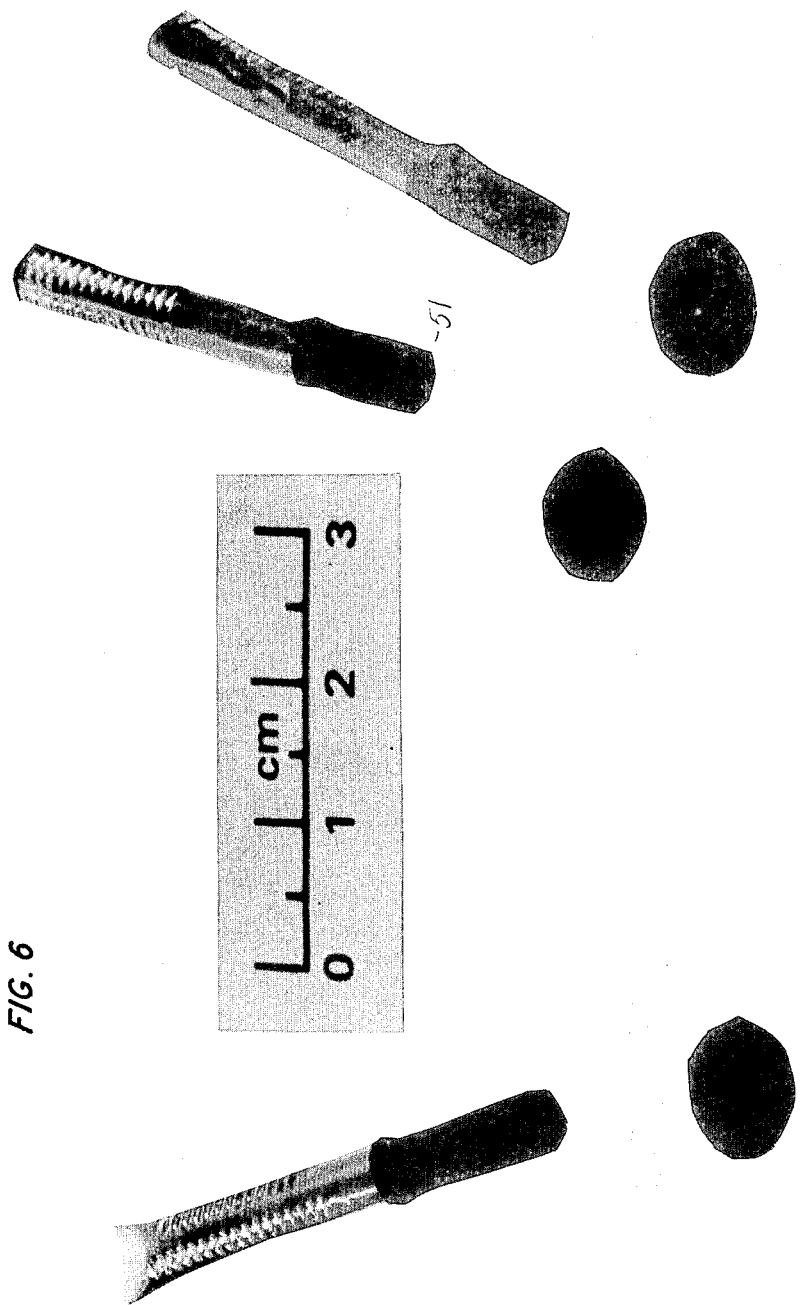
FIG. 6 shows fractured rivets after testing.

A three inch by three inch by 0.136 inch (7.6 cm by 7.6 cm by 0.345 cm) plate of unidirectionally oriented silicon carbide fiber reinforced lithium aluminosilicate matrix composite was fabricated as described in U.S. Pat. No. 4,324,843. This composite plate was cut into bars about 0.210 inch (0.53 cm) wide. This provides a cross-sectional area of the bar approximately equivalent to that of a round bar 0.19 inch (0.48 cm) in diameter. These rectangular bars served as the preforms. A round bar mold was constructed by clamping together two plates of graphite three inches by three inches by 0.5 inch (7.6 cm by 7.6 cm by 1.3 cm) separated by a paper card 0.006 inch (0.015 cm) thick and drilling holes symmetrically about the center plate using a 0.1935 inch (0.49 cm) diameter (number 10) drill. Sheets of molybdenum 0.003 inch (0.0076 cm) thick were deformed to conform to the shape of the graphite mold so made. The rectangular rods were appropriately positioned between the molybdenum separators and the assembly was placed in a hot press and heated to 1400° C. in an argon atmosphere. When this temperature was reached, pressure was applied to deform (coin) the rectangular rods into round rods. The preforms are shown as in FIG. 1A, the molds as in FIG. 1B and the coined rods in FIG. 1C. A second coining operation was employed to form heads on the rivets. The mold for this operation is shown by FIG. 2 and consisted of a graphite block (21) with holes (22) drilled therein to accommodate the rivets and the beveled section (23) to form the head. A press plate (24) is also shown to form the finished rivets shown in FIG. 3. A composite photomicrograph of an axial section through the head of one of the rivets is shown in FIG. 4. These rivets were tested in tension. The heads were restrained by a standard 82° countersunk bushing and the shaft with soft metal sleeves gripped in a two-jaw grip and strained at a rate of 0.05 inch (0.127 cm) per minute until fracture occurred. All fractures occurred at the base of the head (51) as shown in FIG. 6. Failures were gradual rather than abrupt and the samples supported high loads even after initial crack formation as shown in the stress strain curve of FIG. 5.

EXAMPLE 2

Figure 7:
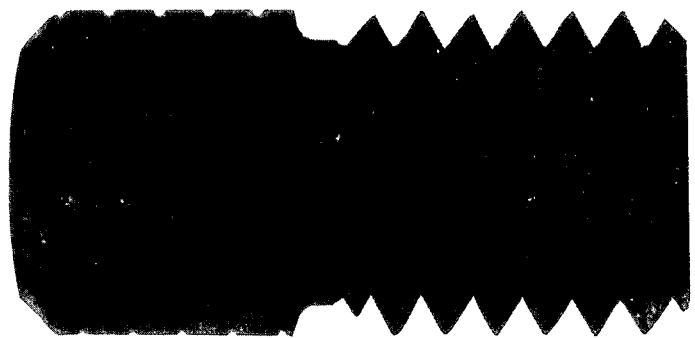
FIG. 7 shows a threaded bolt according to the present invention.
Figure 8:
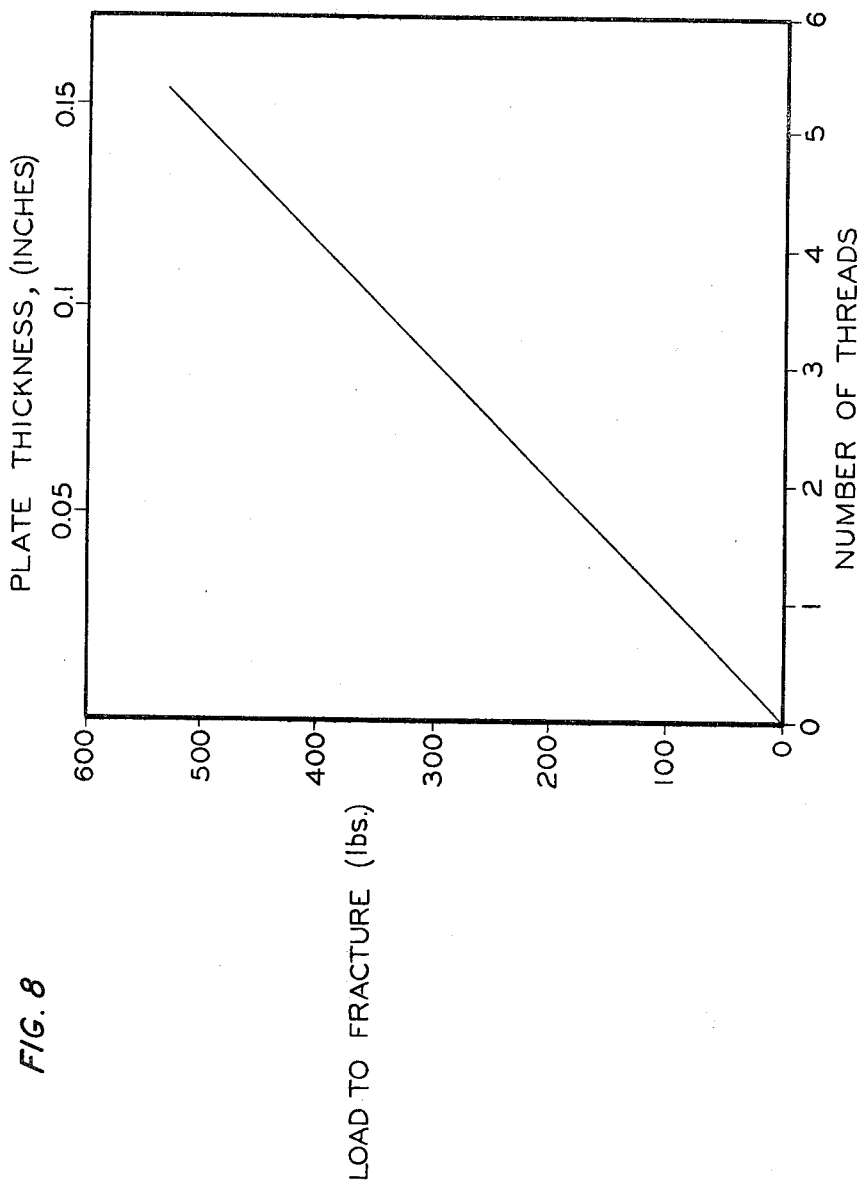
FIG. 8 shows load required to shear off threads in silicon-carbide glass-ceramic composite plates useful according to the present invention.

It has been determined that silicon carbide-glass-ceramic matrix composite rods can be threaded as shown in FIG. 7 by single point cutting in a machine lathe. Threading can also be performed by coining in the same manner and at the same time that the original shaft form is coined. Although testing was not performed to determine failure of the coined threads, load bearing data for tapped (National Fine Thread number 10-32) plates of 0°/90° oriented fiber reinforced glass matrix composite material is representative of a load required to shear off threads of this material and is shown in FIG. 8. It can be shown that thread loads are appropriate for a material having a shear strength of about 6500 psi (44.7 MPa).

Although multiple coining techniques were used to produce the materials for fastening, it can be appreciated by one skilled in the art that such procedures can be automated for mass production purposes, and that for most applications, a single coining operation would suffice to form the fastener.

Although the invention has been shown and described with respect to detailed embodiments thereof, it should be understood by those skilled in this art that various changes and omissions in form and detail may be made therein without departing from the spirit and scope of the invention.

We claim:

1. A method of securing fiber reinforced glass matrix composite material to a structural member comprising molding and machining a high temperature stable fiber reinforced glass matrix composite material into rivet or bolt form, forming substantially concentric holes in the composite material and structural member at the point of attachment, securing the composite material to the structural member by inserting the rivet or bolt through such holes and closing the open end of the rivet or bolt by heat deforming or nut means respectively, so as to produce a composite material-structural member which remains secure under extreme temperature fluctuations.

2. The method of claim 1 wherein the structural member is silicon carbide fiber reinforced glass matrix material.

3. The method of claim 1 wherein the structural member is metal.

4. The method of claim 1 wherein the structural member is unreinforced ceramic, glass or glass-ceramic.

5. The method of claim 1 wherein the high temperature stable fibers are silicon carbide, graphite or alumina.

6. A method of making a fiber reinforced glass matrix composite rivet or a bolt comprising hot pressing a mixture of glass matrix material containing about 20% to about 60% by volume high temperature stable fibers to form a sheet of high temperature stable, fiber reinforced composite material, cutting the sheet into bars of substantially square cross section, heating the cut bars in a mold to deform the bars into bars of substantially circular cross section, heating one end of the deformed bars to form a flat head section.

7. The method of claim 6 including coining threads on the bars during or after forming the substantially circular cross section.

8. The method of claim 6 including machining threads on the bars of cylindrical cross section.

9. The method of claim 6 wherein the reinforcing fibers are silicon carbide, graphite, or alumina.

10. The method of claim 6 wherein the matrix material is borosilicate, aluminosilicate, high silica content glass, or lithium aluminosilicate glass ceramic.

* * * * *